United States Patent
Hirose et al.

(10) Patent No.: US 11,161,197 B2
(45) Date of Patent: Nov. 2, 2021

(54) JOINED STRUCTURE AND JOINING METHOD

(71) Applicant: Panasonic Intellectual Property Management Co., Ltd., Osaka (JP)

(72) Inventors: Takayuki Hirose, Osaka (JP); Yasushi Taniguchi, Osaka (JP); Seiji Kumazawa, Nara (JP); Takayuki Ashida, Hyogo (JP)

(73) Assignee: Panasonic Intellectual Property Management Co. Ltd., Osaka (JP)

( * ) Notice: Subject to any disclaimer, the term of this patent is extended or adjusted under 35 U.S.C. 154(b) by 316 days.

(21) Appl. No.: 16/245,159

(22) Filed: Jan. 10, 2019

(65) Prior Publication Data
US 2019/0224776 A1    Jul. 25, 2019

(30) Foreign Application Priority Data

Jan. 24, 2018    (JP) .............................. JP2018-009863

(51) Int. Cl.
*B23K 20/10*    (2006.01)
*B29C 65/08*    (2006.01)
(Continued)

(52) U.S. Cl.
CPC ............. *B23K 20/10* (2013.01); *B29C 65/081* (2013.01); *B29C 66/21* (2013.01); *B29C 66/43* (2013.01);
(Continued)

(58) Field of Classification Search
CPC ...... Y02E 60/10; B23K 20/10; B23K 20/106; B23K 2101/38; B23K 2103/166;
(Continued)

(56) References Cited

U.S. PATENT DOCUMENTS

| | | | |
|---|---|---|---|
| 4,904,327 A | * | 2/1990 | Clark .................... B01D 63/02 156/250 |
| 2004/0020580 A1 | | 2/2004 | Oishi et al. |

(Continued)

FOREIGN PATENT DOCUMENTS

| | | |
|---|---|---|
| CN | 1490906 | 4/2004 |
| JP | 2006-231402 | 9/2006 |

(Continued)

OTHER PUBLICATIONS

English-Language Translation of Chinese Search Report dated Jul. 9, 2021 in Chinese Patent Application No. 201910047347.4.

*Primary Examiner* — Philip C Tucker
*Assistant Examiner* — Brian R Slawski
(74) *Attorney, Agent, or Firm* — Wenderoth, Lind & Ponack, L.L.P.

(57) ABSTRACT

A highly reliable joined structure and joining method by suppressing peeling at joined portions in the joined structure formed by joining metals together is provided. A joined structure includes a plurality of metals laminated and joined together. The plurality of metals are shaped to include a plurality of convex portions arranged on a surface positioned in a lamination direction, and flat portions arranged between the plural convex portions. Tip ends of the plurality of convex portions are formed as curved surfaces.

5 Claims, 8 Drawing Sheets

(51) Int. Cl.
  *B29C 65/00* (2006.01)
  *B32B 3/02* (2006.01)
  *B32B 15/01* (2006.01)
  *H01M 4/13* (2010.01)
  *H01M 4/02* (2006.01)
  *B29L 31/34* (2006.01)
  *B29L 9/00* (2006.01)

(52) U.S. Cl.
  CPC .......... *B29C 66/81433* (2013.01); *B32B 3/02* (2013.01); *B32B 15/01* (2013.01); *H01M 4/02* (2013.01); *H01M 4/13* (2013.01); *B29L 2009/003* (2013.01); *B29L 2031/3468* (2013.01)

(58) Field of Classification Search
  CPC .......... B32B 3/02; B32B 15/01; B32B 15/04; B32B 15/043; B32B 15/20; H01M 4/02; H01M 4/043; H01M 4/13; H01M 4/1395; H01M 4/64; H01M 4/70; H01M 4/78; B29L 2009/003; B29L 2031/3468; B29C 65/08; B29C 65/081; B29C 65/088; B29C 66/21; B29C 66/301; B29C 66/43; B29C 66/81433; B29C 66/81435
  USPC ........ 156/60, 73.1, 160, 196, 210, 212, 219, 156/221, 222, 290, 308.2, 308.4, 309.6; 228/110.1; 429/162, 324, 338, 342, 209, 429/220, 211
  See application file for complete search history.

(56) References Cited

U.S. PATENT DOCUMENTS

| | | | |
|---|---|---|---|
| 2006/0169388 A1* | 8/2006 | Shimizu | B29C 66/21 156/73.1 |
| 2009/0123776 A1 | 5/2009 | Straza | |
| 2009/0311601 A1* | 12/2009 | Kashiwagi | H01M 4/362 429/218.1 |
| 2014/0299652 A1* | 10/2014 | Kim | B23K 20/106 228/110.1 |
| 2015/0214568 A1* | 7/2015 | Murakami | B23K 20/106 429/209 |
| 2017/0342576 A1* | 11/2017 | McWaid | C25B 9/70 |
| 2018/0085847 A1* | 3/2018 | Sato | B23K 20/106 |

FOREIGN PATENT DOCUMENTS

| | | |
|---|---|---|
| JP | 2012-125801 | 7/2012 |
| JP | 2015-199095 | 11/2015 |

* cited by examiner

JOINED STRUCTURE AND JOINING METHOD

TECHNICAL FIELD

The technical field relates to a joined structure and a joining method between metals.

BACKGROUND

As one of the methods of joining metals together, ultrasonic joining is known. The ultrasonic joining is a technique of forming a joined structure by arranging laminated works on an anvil (fixed end) and vibrating the works with ultrasonic waves while pushing the works by a horn (vibration source) to join the works together. At this time, the thickness of a portion of the work contacting a horn abutting surface is reduced. Moreover, stress is concentrated on portions contacting bottom surfaces between protrusions formed in the horn abutting surface in the work. Therefore, a break or a crack tends to occur in these portions in the work. The partial break or the crack may cause peeling at a joined portion during actual use, assembly work of the joined structure and the like and may adversely affect reliability of products. As methods for solving the problem, a margin region where there is no groove is provided in a peripheral edge portion of the horn abutting surface in JP-A-2012-125801 and the bottom surfaces between protrusions in the horn abutting surface are formed by surfaces with no corner part in JP-A-2015-199095.

However, in JP-A-2012-125801, excessive vibration not contributing to joining strength is added as the margin region contacts the work, and so a break or a crack occurs. Peeling occurs at a joined portion of the joined structure due to the break or the crack. Even when the bottom surfaces between protrusions in the horn abutting surface are formed by surfaces with no corner part as in JP-A-2015-199095, vibration is added in a state in which deformation of the work is suppressed when the work contacts the bottom surfaces between protrusions, and so the break or the crack occurs in the work. Peeling occurs at the joined portion of the joint structure due to the break or the crack.

SUMMARY OF THE INVENTION

The present disclosure has been made for solving the above problems, and an object thereof is to provide a highly reliable joined structure and joining method in which peeling in the joined portion is suppressed.

In order to achieve the above object, a joined structure according to the present disclosure is a joined structure in which a plurality of metals are laminated and joined together, in which the plural metals include a plurality of convex portions arranged on a surface positioned in a lamination direction and flat portions arranged between the plural convex portions, and tip ends of the plural convex portions are formed by curved surfaces.

A joining method according to the present disclosure includes the steps of preparing a work on an anvil and applying ultrasonic vibration by a horn while pushing the horn into the work to thereby perform ultrasonic joining to the work. The horn includes a main body and a plurality of protrusions arranged on a surface of the main body which faces the work, and the work does not contact joining portions between the main body and the plural protrusions.

According to the present disclosure, it is possible to provide a highly reliable joined structure in which peeling at the joined portions is suppressed.

DETAILED DESCRIPTION OF EMBODIMENTS

Hereinafter, embodiments of the present disclosure will be explained with reference to the drawings.

First Embodiment

Figure 4:
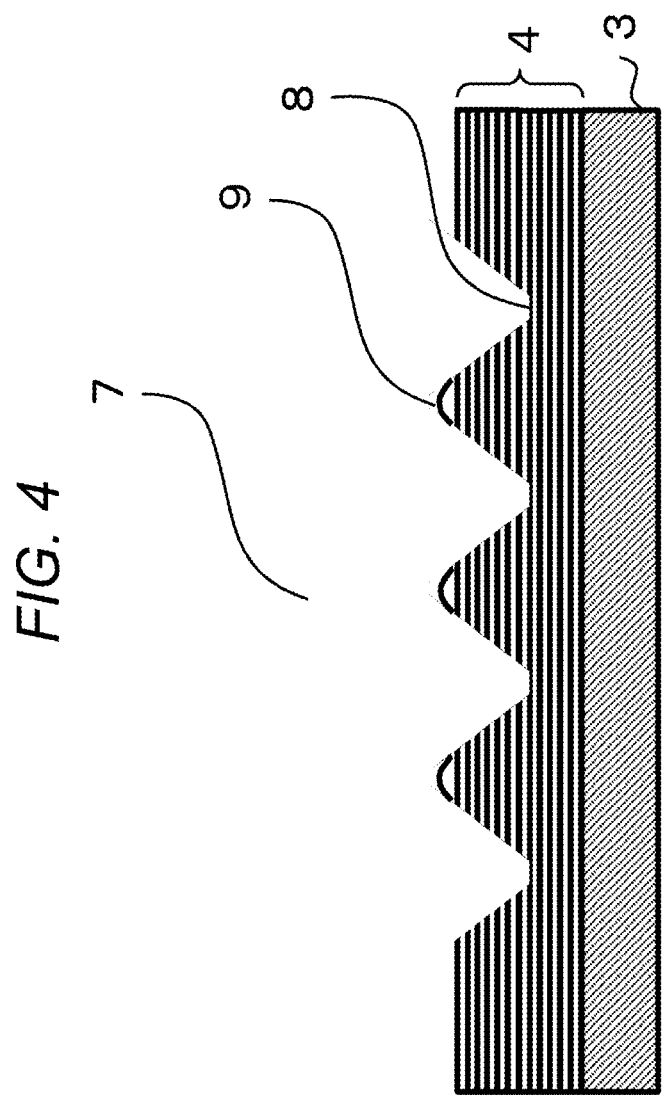
FIG. 4 is a schematic cross-sectional view showing a joined structure according to the first embodiment.

A joined structure according to a first embodiment is a joined structure in which a plurality of metals are laminated and joined, including a plurality of convex portions arranged on a surface positioned in a lamination direction and a flat portion arranged between the plural convex portions, and tip ends of the plural convex portions are formed by curved surfaces. As an example of the joined structure, a joined structure 7 formed by laminating a collector plate 3 and an electrode foil 4 is cited as shown in FIG. 4. That is, the electrode foil 4 and the collector plate 3 are cited as examples of plural metals. The electrode foil 4 is a laminate of plural pieces of metal foil. Copper foil is used as the metal foil. A copperplate is used as the collector plate 3. In this case, for example, the collector plate 3 forms copper leads in a lithium secondary battery, and the electrode foil 4 forms a negative electrode. However, metals are not limited to the collector plate 3 and the electrode foil 4, and the present disclosure can be applied to metals capable of performing ultrasonic joining. It is desirable that the collector plate 3 and the electrode foil 4 have the same kind of material, but different kinds of materials may be used. FIG. 4 is a cross-sectional view in the lamination direction of the collector plate 4 and the electrode foil 3.

Next, a joining method for manufacturing the joined structure 7 will be explained.

Figure 1:
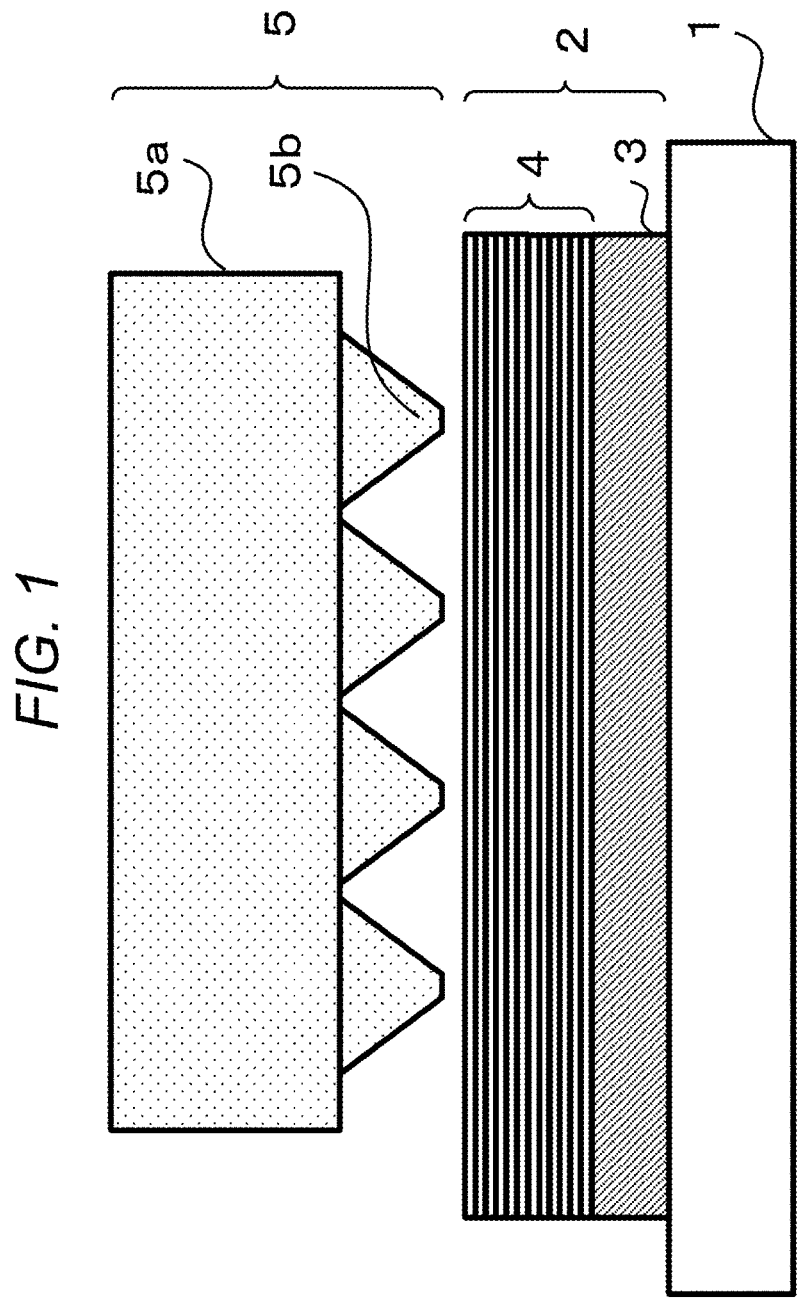
FIG. 1 is a schematic cross-sectional view showing a preparation process of ultrasonic joining according to a first embodiment.

FIG. 1 is a schematic cross-sectional view showing a preparation process of ultrasonic joining according to the first embodiment. An anvil 1 is a member fixed for placing a work 2 formed by laminating the collector plate 3 and the electrode foil 4. In this case, the collector plate 3 is laminated on the anvil 1 side and the electrode foil 4 is laminated on a horn 5 side. The horn 5 is a member that joins the collector plate 3 and the electrode foil 4 together by applying ultrasonic vibration, including a main body 5a and a plurality of protrusions 5b arranged on a surface of the main body 5a which faces the work 2.

Figure 2:
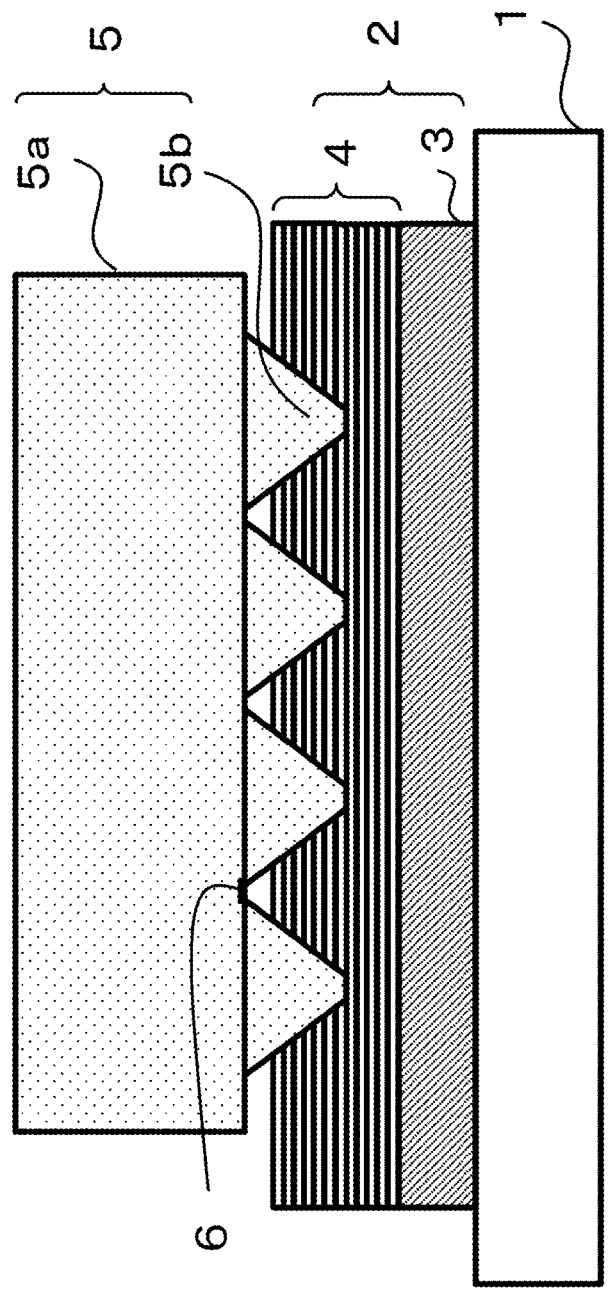
FIG. 2 is a schematic cross-sectional view showing a joining process of ultrasonic joining according to the first embodiment.

FIG. 2 is a schematic cross-sectional view showing a joining process of ultrasonic joining according to the first embodiment. The protrusions 5b are pushed into the work 2 while vibrating the horn 5 with ultrasonic waves. Then, an oxide film on an abutting surface between the collector plate 3 and the electrode foil 4 is peeled off and metal surfaces of the work 2 are bonded together.

Figure 8:
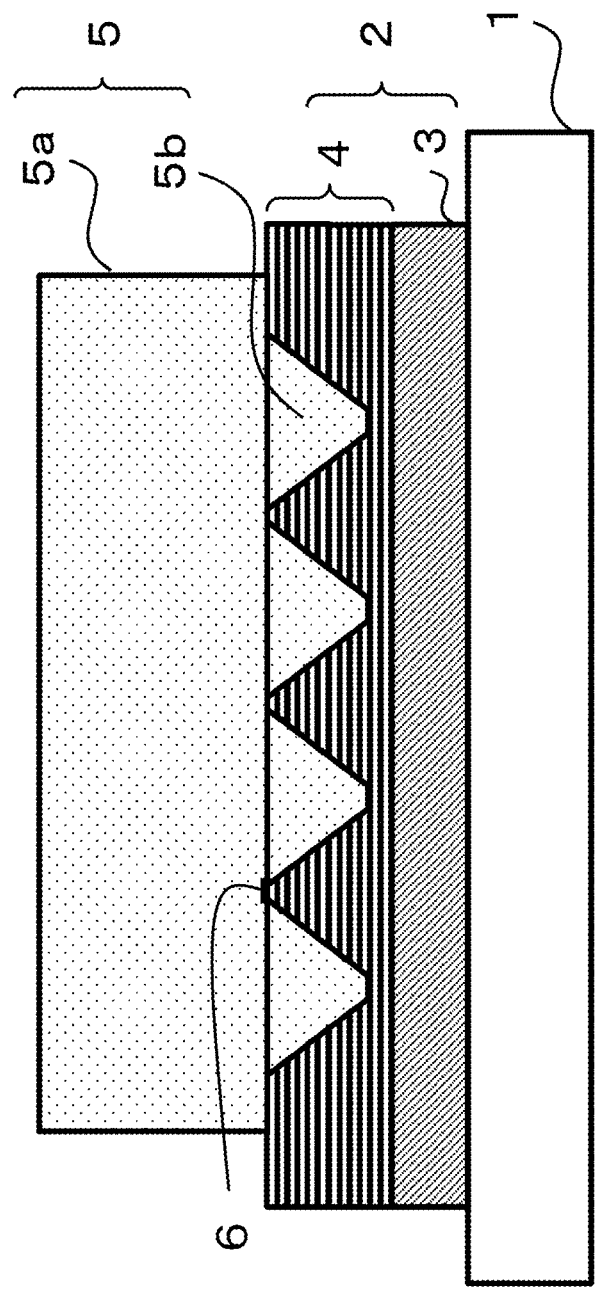
FIG. 8 is a schematic cross-sectional view showing a joining process in common ultrasonic joining.

Here, problems at the time of joining the work 2 will be explained. When the ultrasonic vibration is applied while pushing the work 2 by the horn 5, relative motions occur respectively on the horn 5 side and the anvil 1 side. According to this, plastic flow is generated in the electrode foil 4 and the horn 5 sinks. Then, a volume of the electrode foil 4 corresponding to a sinking amount of the horn 5 flows into portions between the protrusions 5b. At this time, the electrode foil 4 flows into bottom surfaces 6 between protrusions 5b in the horn 5 and abuts on joined portions between the main body 5a and the protrusions 5b as shown in a schematic cross-sectional view showing a joining process in common ultrasonic joining of FIG. 8. As portions into which the electrode foil 4 has been flown function as anchors with respect to the vibration direction, the work 2 is held by the horn 5 and ultrasonic vibration can be effectively applied. However, on the other hand, the electrode foil 4 which has reached the bottom surfaces 6 between protrusions 5b is prevented from flowing any further. Then, the electrode foil 4 contacting the bottom surfaces 6 between protrusions 5b receives vibration in a state where deformation is inhibited, and so a lamination state becomes irregular. Moreover, the electrode foil 4 contacting the bottom surfaces 6 between protrusions 5b receives ultrasonic vibration from the bottom surfaces 6 between protrusions 5b, thereby being joined with each other. Therefore, stress concentration due to the above occurs, and a partial break or crack may be generated on surfaces of the electrode foil 4 contacting the bottom surfaces 6 between protrusions 5b. Furthermore, part of the surfaces of the electrode foil 4 contacts the main body 5a, and so damage is generated in the electrode foil 4 due to the contact. In particular, stress tends to be concentrated on a portion contacting an end portion of the main body 5a.

In view of the above, ultrasonic vibration is applied while controlling the horn 5 so that the work 2 does not contact the bottom surfaces 6 between protrusions 5b as portions sandwiched by the protrusions 5b as shown in FIG. 2. Accordingly, spaces are generated between the electrode foil 4 and the bottoms 6 between protrusions 5b. Therefore, stress concentration due to the contact between the electrode foil 4 and the bottom surfaces 6 between protrusions 5b can be avoided.

Moreover, ultrasonic vibration is applied while controlling the horn 5 so that the work 2 does not contact the main body 5a. As part of surfaces of the electrode foil 4 does not contact the main body 5a, damage in the electrode foil 4 can be suppressed.

According to these effects, a break or a crack in the electrode foil 4 can be suppressed, and peeling in the joined portion can be suppressed.

In order to control the horn 5 as described above, it is desirable to change a pushing amount of the horn 5. Specifically, the pushing amount of the horn 5 is preferably reduced to be smaller than a height of the protrusions 5b. More preferably, the pushing amount of the horn 5 is set to 30% to 90% of the height of the protrusions 5b. When the pushing amount of the horn 5 is smaller than 30% of the height of the protrusions 5b, the holding force between the work 2 and the horn 5 is reduced and joining strength is reduced. When the pushing amount is increased to be higher than 90% of the height of the protrusions 5b, the electrode foil 4 flowing into portions between the protrusions 5b contacts the bottom surfaces 6 between protrusions 5b.

In the ultrasonic joining process, the larger the difference in motions between the collector plate 3 and the electrode foil 4 in the vibration direction, the higher the frictional heat becomes, which improves joining strength. As the electrode foil 4 according to the present disclosure does not flow into the bottom surfaces 6 between protrusions 5b, the electrode foil 4 hardly functions as the anchor with respect to the vibration direction. Therefore, the difference in motions in the vibration direction is increased in the above joining process, which increases joining strength.

Figure 3:
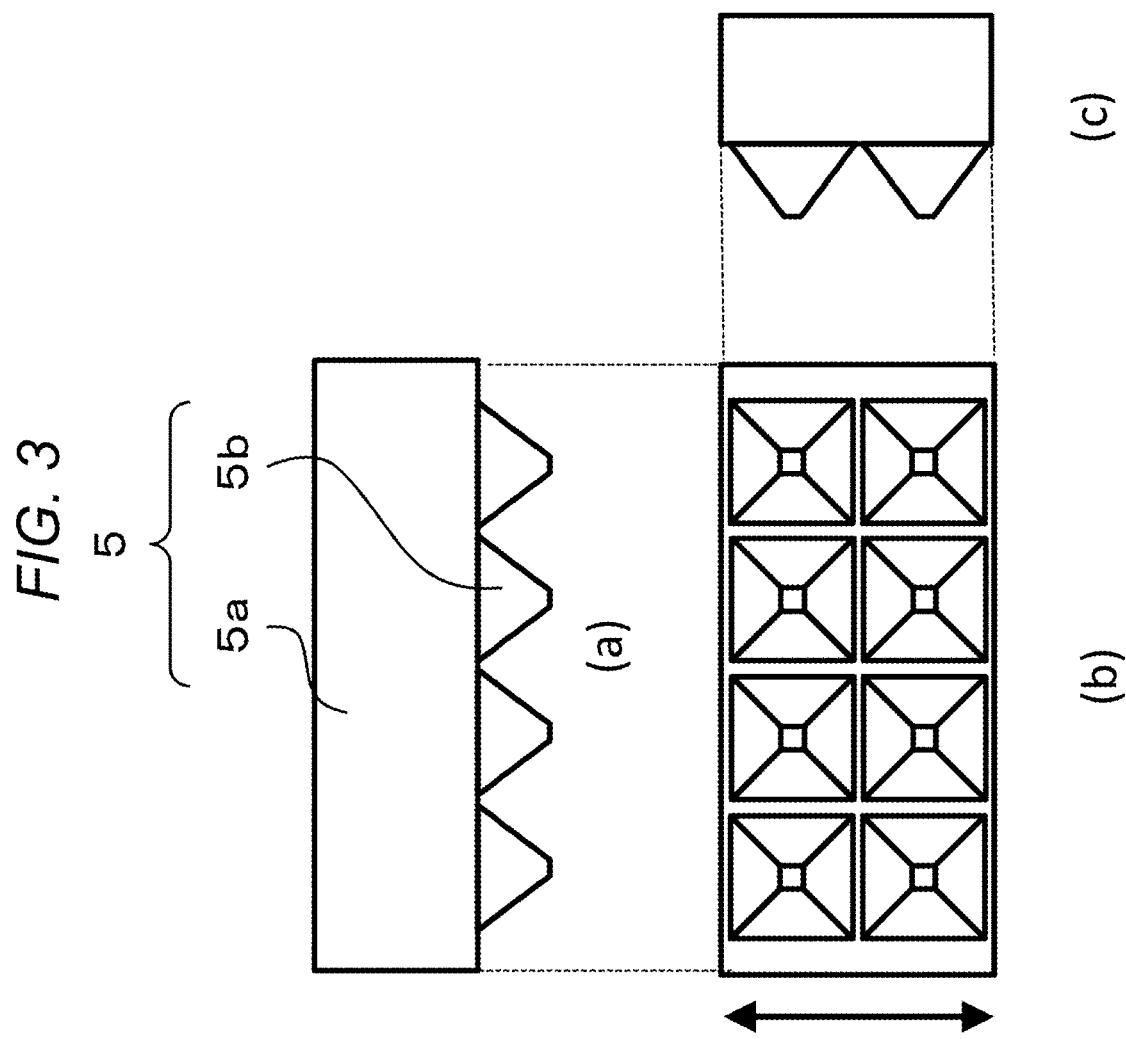
FIG. 3 is a schematic three-surface view showing a horn according to the first embodiment.

On the other hand, the larger a sinking amount of the protrusions 5b, the higher the joining strength is improved in the ultrasonic joining process. That is because bulking between foils proceeds as the protrusions 5b come closer to the anvil 1 side and vibrates. In the case of the present disclosure, the protrusions 5b are controlled not to sink by spaces between part of the surfaces of the electrode foil 4 and the main body 5a, and so it is desirable to compensate for the joining strength which reduces for the spaces. Accordingly, the height of the protrusions 5b can be increased. That is because the joining strength of the work 2 is increased as a contact area between the electrode foil 4 and the protrusions 5b is increased. It is most preferable that the height to be changed corresponds to the same value as the space between part of the surfaces of the electrode foil 4 and the main body 5a. However, the height may be changed according to a thickness of the electrode foil 4. More specifically, the height of the protrusions 5b may be changed so that tip ends of the protrusions 5b reach positions in a range of from 30% to 90% of the thickness of the electrode foil 4 when the horn 5 sinks into the work 2 with the maximum depth. When the tip ends of the protrusions 5b are in a position shallower than 30% of the thickness of the electrode foil 4, the holding force between the work 2 and the horn 5 is reduced and joining strength is reduced. When the tip ends are in a position exceeding 90% of the thickness of the electrode foil 4, a break or a crack tends to occur in the electrode foil 4 from portions where the protrusions 5b sink. FIG. 3 is a schematic three-surface view showing the horn 5 according to the first embodiment. (a) of FIG. 3 is a front view, (b) of FIG. 3 is a plan view and (c) of FIG. 3 is a side surface view.

The main body 5a has a rectangular parallelepiped shape in the first embodiment, however, the present disclosure is not limited to this. For example, the main body 5a may be connected to another device or the like, and other surfaces may have curved surfaces as far as a surface facing the work 2 is flat. It is also preferable to chamfer end portions or remove end portions for suppressing damage in the electrode foil 4 contacting end portions of the main body 5a.

The protrusions 5b are arranged in two rows and four columns for simplification, however, the present disclosure is not limited to this. Each protrusion 5b can have a shape in which the tip end is not sharp and a cross-sectional area is gradually increased toward the main body 5a. Therefore, a truncated square pyramid is adopted in the embodiment. However, the present disclosure is not limited to this shape, and shapes such as a circular truncated cone, or a truncated polygonal pyramid may be considered. When using shapes such as a cone or a polygonal pyramid, it is preferable to chamfer tip ends or remove corners.

In the joining process, it is preferable to align the ultrasonic vibration direction and a short-side direction of the horn 5 in a direction indicated by an arrow in a vertical direction in (b) of FIG. 3. Accordingly, variations in vibration in respective protrusions 5b are reduced, therefore, variations in joining strength can be suppressed.

FIG. 4 is a schematic cross-sectional view showing the joined structure 7 according to the first embodiment. The collector plate 3 and the electrode foil 4 are ultrasonically-joined by using the above joining method to thereby form the joined structure 7. The joined structure 7 includes a plurality of flat portions 8 and a plurality of convex portions 9 protruding higher than the flat portions 8 on a surface positioned in the lamination direction of the collector plate 3 and the electrode foil 4. The flat portions 8 are arranged so as to be respectively positioned between arranged plural convex portions 9.

Tip ends of plural convex portions 9 are respectively formed by curved surfaces. This is because there is no contact with the bottom surfaces 6 between protrusions 5b in the joining process, and the shape formed by being raised by plastic flow of the electrode foil 4 is kept.

In the electrode foil 4 in which plastic flow is not inhibited, deformation is not restrained and the lamination state hardly becomes irregular. Accordingly, stress concentration caused by the irregular lamination state hardly occurs. Therefore, the tip ends of the convex portions 9 are formed by curved surfaces, which can suppress peeling at joining portions of the joining structure 7 caused by a break or a crack due to stress concentration.

Moreover, root portions of the convex portions 9, namely, the parts of the convex portions 9 located closer to the flat portions 8 than to the tip ends are formed by flat surfaces as shown in FIG. 4. This is because the shape of the protrusions 5b is transferred by receiving the pushing by the horn 5 in the joining process. Portions of the electrode foil 4 contacting the horn 5 receive ultrasonic vibration and are ultrasonically-joined, so that stress is concentrated. Here, the convex portions 9 positioned closer to the flat portion 8 side than the tip ends have larger cross-sectional areas than the tip ends, and so a break or a crack hardly occurs even when stress is concentrated.

Therefore, peeling at joining portions hardly occurs in the convex portions 9 positioned closer to the flat portions 8 side than the tip ends, and the joining portions have high joining strength.

Figure 5:
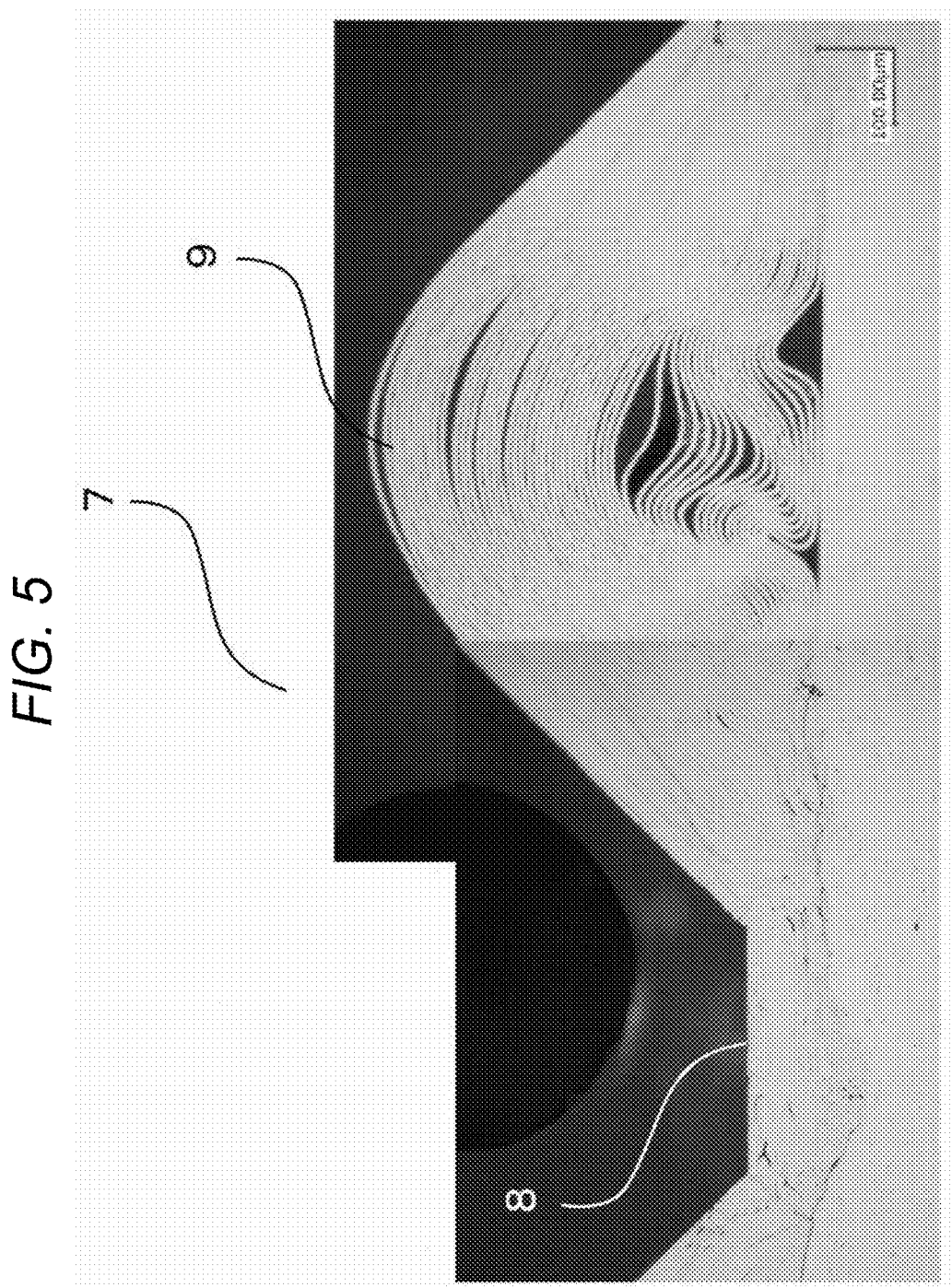
FIG. 5 is a partially enlarged view of a cross section of a flat portion and a convex portion in the joined structure according to the first embodiment.

FIG. 5 is a partially enlarged view of a cross section of the flat portion 8 and the convex portion 9 in the joined structure 7 according to the first embodiment. In the vicinity of the flat portion 8, plural pieces of metal foil forming the electrode foil 4 are joined together or the metal foil exhibits an irregular lamination state. The stress is concentrated on the flat portion 8 due to the above. On the other hand, plural pieces of metal foil contained in the tip end of the convex portion 9 are not joined together. Accordingly, stress concentration due to the joining of pieces of metal foil with one another and the irregular lamination state of the electrode foil 4 does not easily occur on the tip end of the convex portion 9.

When a metal with high elasticity such as copper is used as the material of the electrode foil 4, high vibration energy is necessary for joining the electrode foil 4 and the collector plate 3 together. Accordingly, the problem of the break or the crack further tends to occur. Therefore, the application of the present disclosure is effective. In the case where a metal with low elasticity such as aluminum is used as the material of the electrode foil 4, the metal is easily fixed to the horn 5 and there is a possibility that the metal is peeled off with the horn 5 after the joining process. As the electrode foil 4 does not contact the bottom surfaces between protrusions 6 in the present disclosure, the area of the electrode foil 4 contacting the horn 5 is reduced, and the break or the crack generated by peeling of the electrode foil 4 with the horn 5 can be reduced. Therefore, the present disclosure is effective in ultrasonic joining between metals.

Second Embodiment

Figure 6:
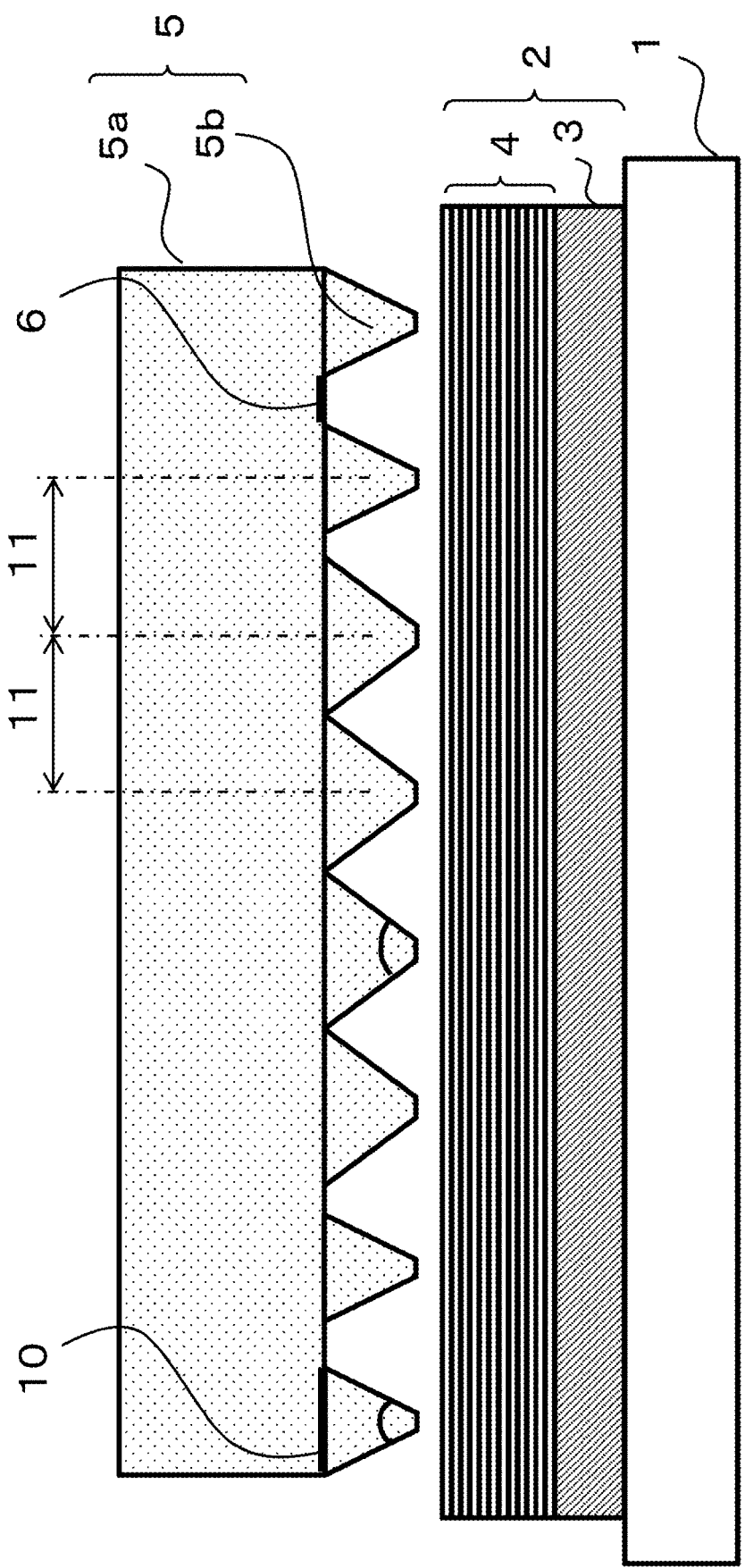
FIG. 6 is a schematic cross-sectional view showing a preparation process of ultrasonic joining according to a second embodiment.

FIG. 6 is a schematic cross-sectional view showing a preparation process of ultrasonic joining according to a second embodiment. Items which are not explained are the same as those of the first embodiment. The embodiment differs from the first embodiment in a point that cross-sectional areas of protrusion bottom surfaces 10 on a cross section (cross section in a depth direction of FIG. 6) parallel to a principal surface of the horn 5 are not uniform.

In the joining process, the electrode foil 4 exhibits the behavior of crossing over portions between adjacent protrusions 5b and spreading over a peripheral edge portions of the horn 5. The electrode foil 4 spreading from the central part toward the peripheral edge portion of the horn 5 flows into portions between the protrusions 5b in the peripheral edge portion of the horn 5. Furthermore, the electrode foil 4 existing on an outer side of the horn 5 also flows into portions between the protrusions 5b in the peripheral edge portion of the horn 5. Therefore, a larger amount of electrode foil 4 flows into the portions between the protrusions 5b in the peripheral edge portion of the horn 5 as compared with portions between the protrusions 5b in the central part of the horn 5.

Accordingly, volumes of the portions between the protrusions 5b in the peripheral edge portion of the horn 5 are preferably larger than those in the central part of the horn 5. Accordingly, even when a larger amount of electrode foil 4 flows into the portions between the protrusions 5b, the volumes of the portions between the protrusions 5b are large. Therefore, the electrode foil 4 does not contact the main body 5a of the horn 5. Therefore, it is possible to suppress generation of a break or a crack in the electrode foil 4.

In order to increase the volumes of portions between protrusions 5b as described above, cross-sectional areas of the protrusions 5b positioned at ends are reduced to be smaller than cross-sectional areas of protrusions 5b positioned in the center in the protrusions 5b on the cross section of the protrusion bottom surfaces 10 in the second embodiment. Here, the protrusion bottom surface 10 indicates a joining surface between the main body 5a and the protrusion 5b. Intervals between protrusions 11 and heights of the protrusions 5b in the entire horn 5 are uniform.

The joining strength of the work 2 is increased as the contact area between the electrode foil 4 and the protrusions 5b is increased. That is because portions where the electrode 4 contact the protrusions 5b are ultrasonically-joined by applying ultrasonic vibration to the electrode foil 4 from the protrusions 5b. When the cross-sectional area of the protrusion bottom surface 10 is reduced, the contact area between the electrode foil 4 and the protrusion 5b is reduced. Therefore, the joining strength is reduced. Accordingly, it is preferable that cross-sectional areas the protrusion bottom surfaces 10 are reduced only in the protrusions 5b positioned in the peripheral edge portion. In FIG. 6, shapes of two protrusions 5b counting from the peripheral edge portion are changed for simplification, however, the present disclosure is not limited to this. The shapes may be suitably changed in accordance with the number of protrusions 5b or the size of the horn 5.

It is also preferable that respective cross-sectional areas of the protrusions 5b are gradually reduced from the center to the ends in the cross section of the protrusion bottom surfaces 10. In this case, it is possible to reduce variations in joining strength as the heights of the protrusions 5b do not sharply change.

In order to increase the volumes of portions between protrusions 5b, it is possible that the cross-sectional areas of the protrusion bottom surfaces 10 and the heights of the protrusion 5b are made uniform, and that the intervals between protrusions 11 are changed. In this case, the intervals between protrusions 11 are increased to be larger in the protrusions 5b existing in the peripheral edge portion of the horn 5 than in the protrusions 5b in the central part of the horn 5.

Figure 7:
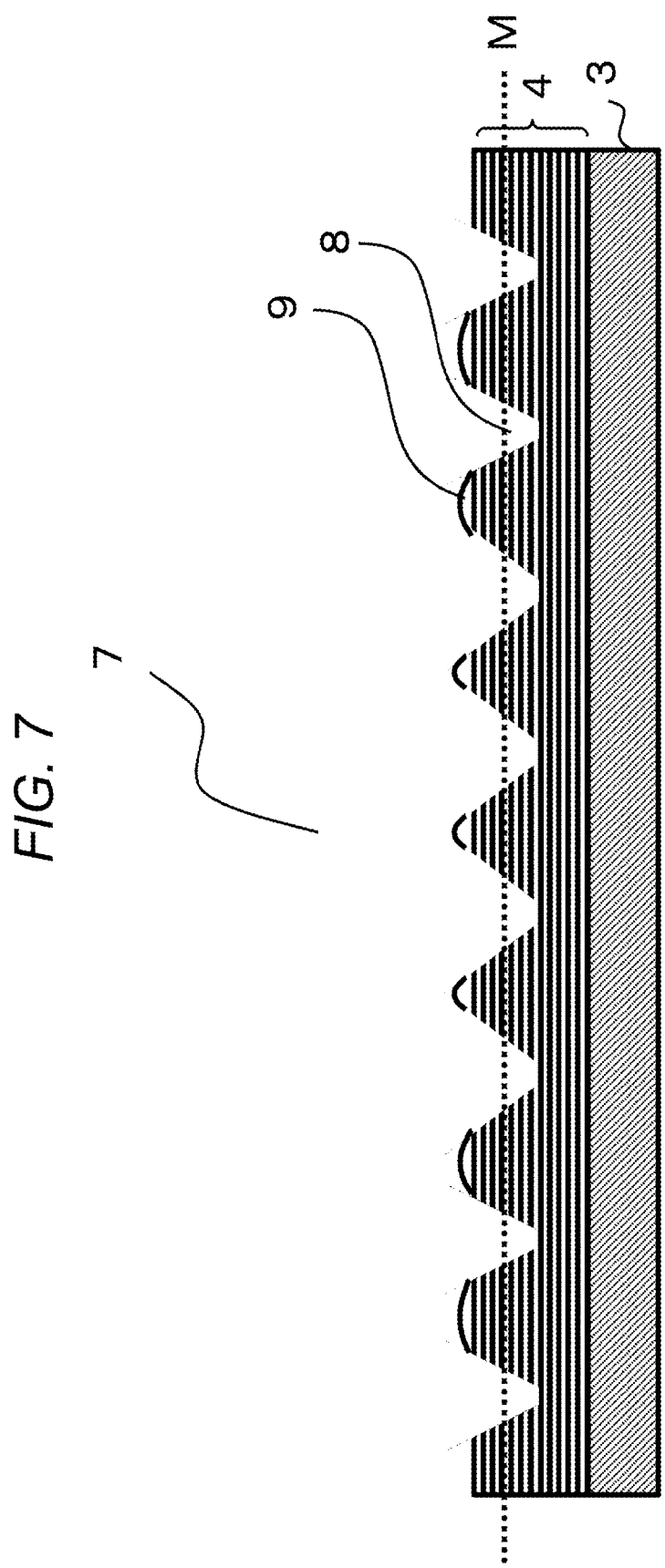
FIG. 7 is a schematic cross-sectional view showing a joined structure according to the second embodiment.

FIG. 7 is a schematic cross-sectional view showing the joined structure 7 according to the second embodiment. The joining process is the same as that of the first embodiment except that the horn 5 shown in FIG. 6 is used, therefore, explanation is omitted. The joined structure 7 includes plural flat portions 8 and plural convex portions 9 protruding higher than the flat portions 8.

A surface passing a position of a height obtained by dividing an average value of heights of the plural convex portions 9 with respect to the flat portions 8 into two as well as parallel to the flat portions 8 is set as a reference surface M. In this case, cross-sectional areas of the convex portions 9 positioned at ends are larger than cross-sectional areas of the convex portions 9 positioned in the center on the cross section of the reference surface M. The fact that the cross-sectional areas of the convex portions 9 on the reference surfaces M are large means that a larger amount of metal foil can be laminated thereinside. A larger amount of electrode foil 4 flows into the convex portions 9 positioned at the ends in the joining process. When the cross-sectional areas of the convex portions 9 at the ends on the reference surface M are increased, it is possible to inhibit the joining between pieces of metal foil and the irregular lamination state of the electrode foil 4 even when a larger amount of electrode foil 4 flows. That is, stress is hardly concentrated on the convex portions 9 having the above shape.

It is also preferable that respective cross-sectional areas of the convex portions 9 are gradually increased from the center to the ends on the cross section of the reference surface M. In this case, variations in joining strength can be suppressed as the electrode foil 4 is not concentrated to ends of the joined structure 7.

According to the above structure, it is possible to suppress peeling at joining portions caused by expansion and development of a partial break or crack in the work 2 during actual use or assembly work of the joined structure 7. Accordingly, it is possible to prevent damage of the joined structure 7 and increase in electric resistance, thereby realizing high reliability.

The joined structure of the present disclosure can be used particularly as electrodes of a battery, for example, a lithium secondary battery and a manufacturing method thereof.

What is claimed is:

1. A joined structure comprising a plurality of metals laminated and joined together,
    wherein the plurality of metals are shaped to include a plurality of convex portions arranged on a surface positioned in a lamination direction, and a plurality of flat portions arranged between the plurality of convex portions,
    wherein tip ends of the plurality of convex portions are formed as curved surfaces, and
    wherein each of the plurality of convex portions is formed of a lamination of a plurality of pieces of metal foil.

2. The joined structure according to claim 1, wherein parts of the plurality of convex portions located closer to the flat portions than to the tip ends are formed as flat surfaces.

3. The joined structure according to claim 1, wherein the plurality of pieces of metal foil contained in the tip ends of the plurality of convex portions are not joined together.

4. A joined structure comprising a plurality of metals laminated and joined together,
    wherein the plurality of metals are shaped to include a plurality of convex portions arranged on a surface positioned in a lamination direction, and a plurality of flat portions arranged between the plurality of convex portions,
    wherein tip ends of the plurality of convex portions are formed as curved surfaces, and
    wherein, when a surface passing a position of a height obtained by dividing an average value of heights of the plurality of convex portions with respect to the flat portions by two as well as parallel to the flat portions is set as a reference surface, cross-sectional areas of first ones of the plurality of convex portions positioned at ends of the joined structure are larger than cross-sectional areas of second ones of the plurality of convex portions positioned in a center of the joined structure in the plurality of convex portions on a cross section of the reference surface.

5. The joined structure according to claim 4, wherein respective cross-sectional areas of the plurality of convex portions are gradually increased from the center of the joined structure to the ends of the joined structure on the cross section of the reference surface.

* * * * *